(12) United States Patent
Siddall et al.

(10) Patent No.: US 10,885,903 B1
(45) Date of Patent: Jan. 5, 2021

(54) GENERATING TRANSCRIPTION INFORMATION BASED ON CONTEXT KEYWORDS

(71) Applicant: Amazon Technologies, Inc., Seattle, WA (US)

(72) Inventors: Leah Siddall, Portland, OR (US); Bryan Samis, Denver, CO (US); Shawn Przybilla, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 92 days.

(21) Appl. No.: 16/215,384

(22) Filed: Dec. 10, 2018

(51) Int. Cl.
| | |
|---|---|
| *G10L 15/22* | (2006.01) |
| *G10L 15/18* | (2013.01) |
| *G06F 40/242* | (2020.01) |
| *G10L 15/08* | (2006.01) |

(52) U.S. Cl.
CPC ........ *G10L 15/1815* (2013.01); *G06F 40/242* (2020.01); *G10L 15/22* (2013.01); *G10L 2015/088* (2013.01)

(58) Field of Classification Search
CPC .......... G06F 3/16; G06F 17/24; G06F 40/242; G06F 16/2445; G06F 16/288; G06F 16/29; G06F 16/434; G06F 16/745; G06F 40/30; G06K 9/00; G06K 9/00791; G06K 9/6223; G06K 9/6256; G06K 9/6262; G10L 15/08; G10L 15/1815; G10L 15/22; G10L 2015/088; G10L 15/063; G10L 15/183; G10L 15/25; G10L 15/26; G10L 25/48; H04L 29/06; H04L 29/08; H04L 65/602; H04N 21/845; H04N 5/073; H04N 21/233; H04N 21/234336; H04N 21/44222; H04N 21/4884; H04N 21/8133; H04N 21/8547; G06N 3/08; G06Q 10/06316
USPC ............ 704/235, 9, 211, 243, 270; 707/740; 725/12, 86; 348/468; 375/240.25; 715/201, 205
See application file for complete search history.

(56) References Cited

U.S. PATENT DOCUMENTS

| | | | | |
|---|---|---|---|---|
| 6,243,676 | B1 * | 6/2001 | Witteman | G06F 16/40 |
| | | | | 704/243 |
| 6,363,380 | B1 * | 3/2002 | Dimitrova | G06K 9/00711 |
| | | | | 707/740 |
| 6,480,819 | B1 * | 11/2002 | Boman | G10L 15/26 |
| | | | | 704/257 |

(Continued)

*Primary Examiner* — Gerald Gauthier
(74) *Attorney, Agent, or Firm* — Knobbe, Martens, Olson & Bear, LLP

(57) ABSTRACT

A service for generating textual transcriptions of video content is provided. A textual output generation service utilize machine learning techniques provide additional context for textual transcription. The textual output generation service first utilizes a machine learning algorithm to analyze video data from the video content and identify a set of context keywords corresponding to items identified in the video data. The textual output generation service then identifies one or more custom dictionaries of relevant terms based on the identified keywords. The textual output generation service can then utilize a machine learning algorithm to process the audio data from the video content biased with the selected dictionaries. The processing result can be utilized used to generate closed captioning information, textual content streams or otherwise stored.

24 Claims, 4 Drawing Sheets

(56) References Cited

U.S. PATENT DOCUMENTS

| | | | | |
|---|---|---|---|---|
| 6,505,153 | B1* | 1/2003 | Van Thong | H04N 5/278 |
| | | | | 348/462 |
| 6,961,382 | B1* | 11/2005 | Yu | H04N 19/70 |
| | | | | 375/240.25 |
| 7,013,273 | B2* | 3/2006 | Kahn | G10L 15/26 |
| | | | | 704/235 |
| 7,443,449 | B2* | 10/2008 | Momosaki | H04N 5/44513 |
| | | | | 348/468 |
| 7,774,817 | B2* | 8/2010 | Gupta | H04N 5/76 |
| | | | | 725/25 |
| 8,281,231 | B2* | 10/2012 | Berry | H04N 21/4307 |
| | | | | 715/201 |
| 8,311,832 | B2* | 11/2012 | Miyamoto | H04N 7/0885 |
| | | | | 704/270 |
| 8,958,013 | B2* | 2/2015 | Zinovieva | H04N 21/4394 |
| | | | | 348/468 |
| 9,319,566 | B2* | 4/2016 | Kwon | H04N 21/4884 |
| 10,299,008 | B1* | 5/2019 | Catalano | H04N 21/4884 |
| 10,341,694 | B2* | 7/2019 | Xu | G10L 15/26 |
| 10,733,984 | B2* | 8/2020 | Loghmani | H04N 21/47217 |
| 2009/0235150 | A1* | 9/2009 | Berry | G06F 16/70 |
| | | | | 715/205 |
| 2011/0069230 | A1* | 3/2011 | Polumbus | G06F 16/745 |
| | | | | 348/468 |
| 2014/0373036 | A1* | 12/2014 | Phillips | H04N 21/42203 |
| | | | | 725/12 |
| 2016/0249113 | A1* | 8/2016 | Hundemer | H04N 21/4884 |
| 2017/0048295 | A1* | 2/2017 | McMahon | H04N 21/4333 |
| 2017/0147576 | A1* | 5/2017 | Des Jardins | G06F 16/48 |
| 2018/0199113 | A1* | 7/2018 | Chou | H04N 21/4316 |
| 2018/0203832 | A1* | 7/2018 | Zhang | G06T 7/00 |
| 2018/0277142 | A1* | 9/2018 | Veeramani | G06F 40/58 |
| 2018/0285362 | A1* | 10/2018 | McCoy | G06F 16/29 |
| 2018/0302687 | A1* | 10/2018 | Bhattacharjee | H04N 21/44218 |
| 2018/0308026 | A1* | 10/2018 | Sinha | G06F 16/288 |
| 2018/0329892 | A1* | 11/2018 | Lubbers | G06K 9/6262 |
| 2019/0019037 | A1* | 1/2019 | Kadav | G06K 9/00744 |
| 2019/0034542 | A1* | 1/2019 | Ming | G10L 15/22 |
| 2019/0080180 | A1* | 3/2019 | Lyon | G06K 9/00791 |
| 2019/0102439 | A1* | 4/2019 | Francis | G06F 16/24575 |
| 2019/0122155 | A1* | 4/2019 | Irazabal | G06Q 50/01 |
| 2019/0198022 | A1* | 6/2019 | Varner | G06K 9/00335 |
| 2019/0215578 | A1* | 7/2019 | Beckett | H04N 21/233 |
| 2019/0244606 | A1* | 8/2019 | Baughman | G10L 15/063 |
| 2019/0287519 | A1* | 9/2019 | Ediz | G06F 40/20 |
| 2019/0306563 | A1* | 10/2019 | Chen | H04N 21/488 |
| 2019/0384981 | A1* | 12/2019 | Swaminathan | G06K 9/6256 |
| 2020/0051582 | A1* | 2/2020 | Gilson | H04N 21/4307 |
| 2020/0090246 | A1* | 3/2020 | Goyal | G06K 9/00671 |
| 2020/0105249 | A1* | 4/2020 | Bender | G06F 16/9535 |

* cited by examiner

GENERATING TRANSCRIPTION INFORMATION BASED ON CONTEXT KEYWORDS

BACKGROUND

Generally described, computing devices and communication networks can be utilized to exchange data and/or information. In a common application, a computing device can request content from another computing device via the communication network. For example, a user at a personal computing device can utilize a browser application to request a content page (e.g., a network page, a Web page, etc.) from a server computing device via the network (e.g., the Internet). In such embodiments, the user computing device can be referred to as a client computing device and the server computing device can be referred to as a content provider.

Content providers provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

Some content providers attempt to facilitate the delivery of requested content through the utilization of a content delivery service provider. As with content providers, content delivery service providers also provide requested content to client computing devices often with consideration of efficient transmission of the requested content to the client computing device and/or consideration of a cost associated with the transmission of the content.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
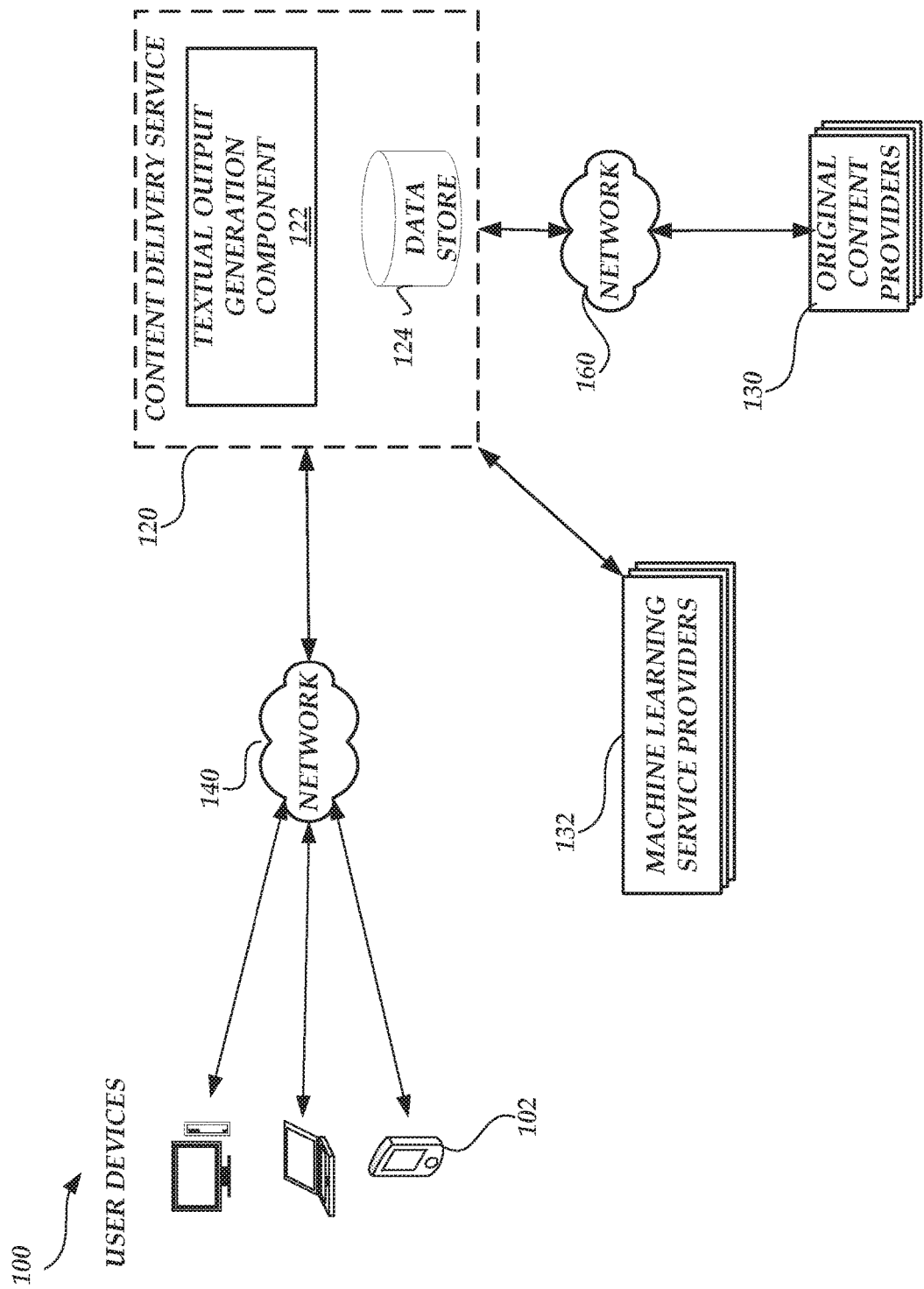
FIG. 1 is a block diagram of a content delivery environment that includes one or more user devices, a content delivery service, one or more machine learning services and an original content provider according to one embodiment.

Generally described, content providers can provide content to requesting users. With regard to video content, a content provider can implement a video packaging and origination service that is able to deliver video content to requesting users. Illustratively, a video packaging and origination service indexes a collection of source video content (either live streaming or file-based video-on-demand) and delivers it to clients via a wide range of communication protocols such as HTTP Live Streaming ("HLS"), Dynamic Adaptive Streaming over HTTP ("DASH"), HTTP Dynamic Streaming ("HDS"), Real Time Messaging Protocol ("RTMP"), Smooth Streaming, and the like. Based on consumer demand, a video packaging and origination service can also provide advanced video transmission features such as just-in-time packaging of video content, digital rights management ("DRM") encryption, time-shifting, bitrate selection, catch up TV, and more.

In some embodiments, to deliver content, content providers can organize requested content, such as a video file, into multiple segments that are then transmitted to requesting devices, segment by segment. For example, in a video stream, each segment typically accounts for 2-10 seconds of video rendered on a receiving device. To provide content to the video packaging and origination service, individual content segments can be encoded by an encoder and transmitted to the video and origination service. Traditionally, a single processing node on the video packaging and origination service can receive an incoming stream of encoded segments or original encoded content for further processing.

Video segments can be encoded according to a defined bitrate and format, which generally defines the number of bits of data that are encoded over a measured amount of time and the specific software algorithm and resulting content representation format utilized to encode the data for transmission. For video files, bitrates are typically measured according to how many kilobits or megabits of data are processed over a second of time. By way of example, a data file that corresponds to 1 megabyte of video data encoded in one second would be considered to have an encoding bitrate of 8 mbps (e.g., 8 megabits per second) while a lower definition video file that corresponds to 45 kilobytes of video data processed in one second would be considered to have an encoding bitrate of 360 kbps (e.g., 360 kilobits per second).

In some embodiments, it may be possible for the content provider to facilitate variable bit rate encoding to enable for variances in the encoding bitrates of individual segments of a video file. In such embodiments, the content provider can generate multiple encoded bitrate versions or combinations of encoded bitrates and formats of individual video file segments. The content provider can then make at least a subset of the multiple bitrate encoded versions available to clients responsive to a request for a particular encoded bitrate version and format. Generally, a content provider can generate a catalog identifying the video segments and encoded bitrates for each identified video segment. The catalog can be written into a manifest file that is provided to individual client computing devices that have requested the video file. Thereafter, once all the versions of an encoded segment are received by the packaging and origination service, the packaging and origination service is available to receive and process requests for encoded content. More specifically, client computing devices, through a respective software application, can request individual video segments according to the available encoded bitrates and formats as published in the manifest file.

To receive content, a client computing device can simply request content having a fixed encoding rate or have a fixed encoding rate selected in response to a streaming content request. Such a fixed encoding rate approach can be deficient in facilitating variance of the encoding bitrate (both positive and negative) based on factors, such as network bandwidth, client computing device utilization, quality demands, and the like. In addition to the association of the encoding bitrate, video segments can be further defined by associating the encoding bitrate with the encoding format utilized by the encoder to generate the output stream. The encoding format can correspond to a content representation format for storage or transmission of video content (such as in a data file or bitstream). Examples of encoding formats include but not limited to the motion pictures expert group ("MPEG") MPEG-2 Part 2, MPEG-4 Part 2, H.264 (MPEG-4 Part 10), H.265 high efficiency video coding ("HEVC"), Theora, RealVideo RV40, VP9, and AOMedia Video 1 ("AV1"), and the like.

Traditionally, a content delivery service can provide additional information associated with the delivery of content, such as textual transcriptions of the audio portions of the content, such as audio data included in the content. The textual transcription can be utilized as an overlay of the streaming content, as a separate stream of textual data (e.g., captioning information) or separately provided or stored. The generation of the textual information can be automated by the content delivery service, such as by utilizing a speech-to-text algorithm. In many instances, however, one or more terms in the audio data may be similarly sounding but have vastly different meanings. For example the term "dough" and "Doh" are similarly sounding terms that have different meaning and context. In other instances, words in audio data may have different meanings/interpretations depending on the context of the audio data. For example, a traditional speech-to-text algorithm may interpret a unique last name of a person as being a traditional sounding term (e.g., a last name of "Wellz" would be interpreted as "wells"). Accordingly, error rates associated with automatic textual information processing can be high or require multiple processing steps to attempt to improve accuracy of the textual transcriptions.

To address at least a portion of the inefficiencies described above with regard to processing video content to generate textual transcriptions, aspects of the present application correspond to a service for generating textual transcriptions of video content. A textual output generation service utilizes a set of machine learning techniques/algorithms to provide or generate textual transcription. The textual output generation service utilizes a first machine learning algorithm corresponding to video recognition machine learning algorithm to analyze video data from the video content and identify a set of context keywords corresponding to items identified in the video data. The textual output generation service then identifies one or more custom dictionaries of relevant terms based on the identified keywords. The textual output generation service can then utilize a second machine learning algorithm corresponding to an audio processing machine learning algorithm to process the audio data from the video content. The second machine learning algorithm is implemented with a bias to the selected dictionaries such that the terms in the dictionary are more likely to be selected by the second machine learning algorithm. The processing result corresponding to a textual information that can be utilized used to generate captioning information (e.g. closed captioning or open captioning information), textual content streams, or otherwise stored.

FIG. 1 illustrates a general content delivery environment 100 for delivering content from original content providers to user devices. The content delivery environment 100 includes a plurality of devices 102 utilized by individual users, generally referred to as client computing devices, to request streaming or download content from a content delivery service 120. Illustratively, the content delivery service 120 can correspond to one or more services utilized in the transmission of the encoded content to user device 102. The content delivery service 120 can include a video packaging and origination service that indexes a collection of source video content (either live streaming or file-based video-on-demand) and delivers it to clients via a wide range of communication protocols such as HTTP Live Streaming ("HLS"), Dynamic Adaptive Streaming over HTTP ("DASH"), HTTP Dynamic Streaming ("HDS"), Smooth Streaming, Real Time Messaging Protocol ("RTMP"), and the like. Based on consumer demand, a video packaging and origination service can also provide advanced video transmission features such as just-in-time packaging of video content, digital rights management ("DRM") encryption, time-shifting, bitrate selection, catch up TV, and more. The content can be illustratively provided by one or more origin sources, such as original content provider 130.

User computing devices 102 may include any number of different computing devices capable of communicating with the networks 140 and 160, via a direct connection or via an intermediary. For example, individual accessing computing devices may correspond to a laptop or tablet computer, personal computer, wearable computer, server, personal digital assistant (PDA), hybrid PDA/mobile phone, mobile phone, electronic book reader, set-top box, camera, appliance (e.g. a thermostat or refrigerator), controller, digital media player, watch, glasses, a home or car device, Internet of Thing ("IoT") devices, virtual reality or augmented reality devices, and the like. Each client computing device 102 may optionally include one or more data stores (not shown in FIG. 1) including various applications or computer-executable instructions, such as web browsers, used to implement the embodiments disclosed herein.

Networks 140 and 160 may be any wired network, wireless network, or combination thereof. In addition, the networks 140 and 160 may be a personal area network, local area network, wide area network, cable network, fiber network, satellite network, cellular telephone network, data network, or combination thereof. In the example environment of FIG. 1, network 140 is a global area network (GAN), such as the Internet. Protocols and components for communicating via the other aforementioned types of communication networks are well known to those skilled in the art of computer communications and thus, need not be described in more detail herein. While each of the client computing devices 102 and content delivery service 120 are depicted as having a single connection to the network 140, individual components of the client computing devices 102 and the content delivery service 120 may be connected to the network 140 at disparate points. Accordingly, communication times and capabilities may vary between the components of FIG. 1. Likewise, although FIG. 1 is illustrated as having three separate networks 140 and 160, one skilled in the relevant art will appreciate that the content delivery service 120 may utilize any number or combination of networks.

In accordance with embodiments, for purposes of illustration, the content delivery service 120 includes one or more servers for receiving content from original content providers 130 and processing the content. As described in further detail below, the content delivery service 120 can include a textual output generation component 122 for processing video content as will be described herein. The content delivery service 120 can further include a data store 124 for maintaining dictionaries of textual terms, and generated outputs streams as described herein.

It will be appreciated by those skilled in the art that the content delivery service 120 may have fewer or greater components than are illustrated in FIG. 1. Thus, the depiction of the content delivery service 120 in FIG. 1 should be taken as illustrative. For example, in some embodiments, components of the content delivery service 120 may be executed by one more virtual machines implemented in a hosted computing environment. A hosted computing environment may include one or more rapidly provisioned and released computing resources, which computing resources may include computing, networking or storage devices. Accordingly, while such components are illustrated as logically being logically grouped in FIG. 1, one skilled in the relevant art will appreciate that one or more aspects of the present application can include the content delivery service 120 as being implemented in multiple geographic areas. Additionally, not all geographic areas hosting portions of the content delivery service 120 will necessary have all the same components or combination of components.

With continued reference to FIG. 1, the content delivery environment 100 also includes original content providers 130. Illustratively, the original content provider can include a plurality of encoders for generating multiple encoded streams for transmission to the content delivery service 120. In one embodiment, individual encoders may generate different encode versions of a content segment according to a different encoding profile.

The content delivery environment 100 can further include a set of machine learning service providers 132 for implementing one or more AI algorithms as described herein. For purposes of the present application, artificial intelligence can generally relate to various technologies utilized to analyze data including, but not limited to, deep learning algorithms, neural network algorithms, machine learning algorithms, big data algorithms, and the like. However, one skilled in the relevant art will appreciate that the present application is not limited to application to AI algorithms or any specific format or type of AI algorithm. Illustratively, the machine learning service providers 132 can provide two or more types of AI algorithms. A first type of AI algorithms corresponds to AI algorithms for processing video data to recognize one or more items depicted in the video portion of the content. Such AI algorithms can utilize one or more training sets that are provided to or accessed by the machine learning service provider 132 and configured to allow individual AI algorithms to generate one or more keywords or identifiers for objects depicted in the video data. The specific training set and AI algorithm corresponding to the first type of AI algorithms can vary according to the machine learning service provider 132, applicable training sets or type of video data. A second type of AI algorithms corresponds to AI algorithms for processing audio data to generate a set of textual information corresponding to at least a subset of the audio portion of content. Such AI algorithms can utilize one or more training sets that are provided to or accessed by the machine learning service provider 132 and configured to allow individual AI algorithms generate textual information. Additionally, the second type of AI algorithms can be illustratively biased or influence by one or more dictionaries of textual terms such that execution of an AI algorithm will cause a preference for selection of terms in the dictionaries. The manner in which the second type of AI algorithm is biased can vary according to AI algorithm or individual machine learning service provider 132. Accordingly, biasing of an AI algorithm does not require a selection of textual terms from dictionaries in every scenario.

Figure 2:
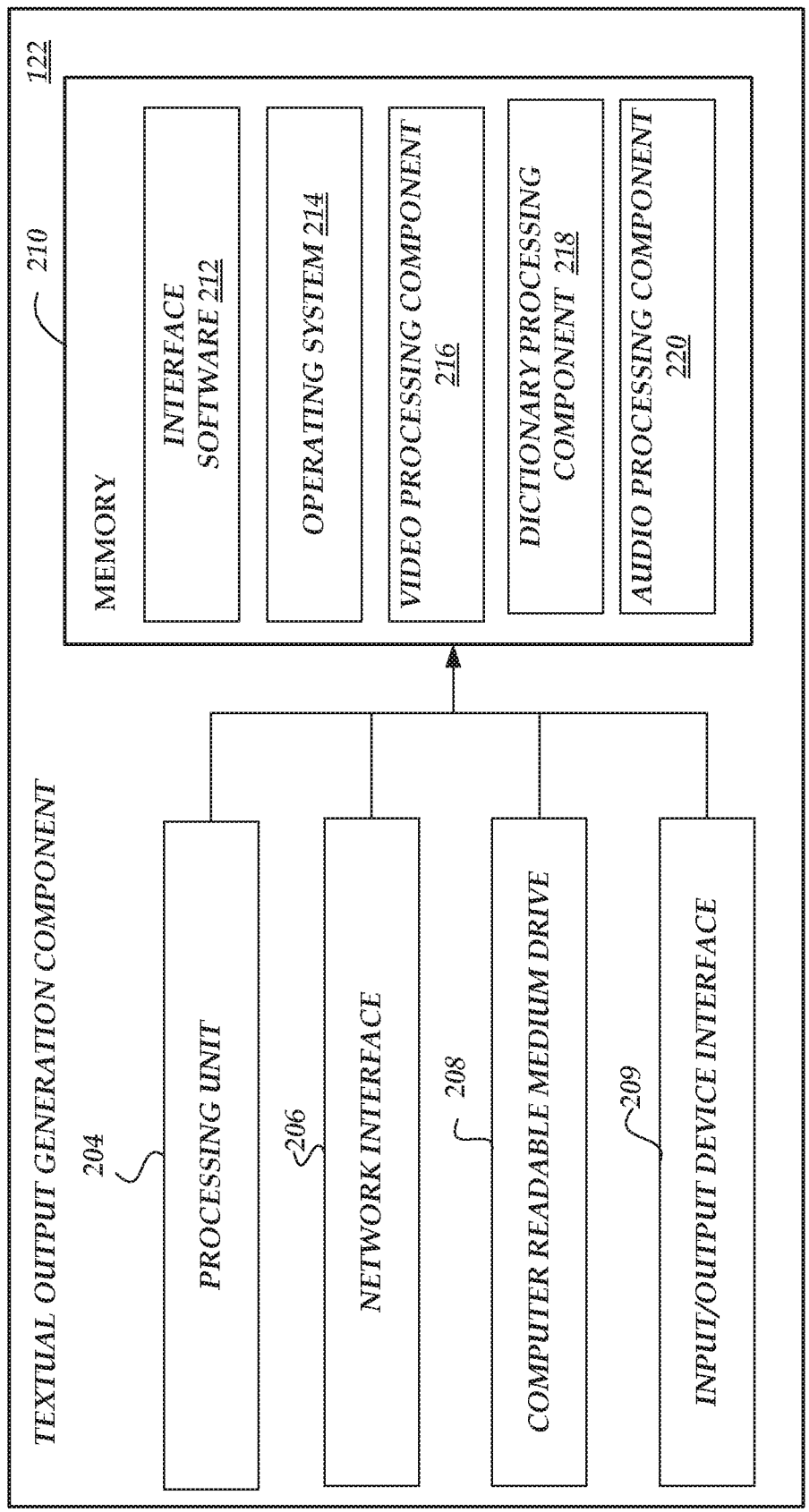
FIG. 2 is a block diagram of illustrative components of a textual output generation component configured to process video content and generate textual information in accordance with an illustrative embodiment.

FIG. 2 depicts one embodiment of an architecture of an illustrative computing device for implementing various aspects of the textual output generation component 122 in accordance with aspects of the present application. The textual output generation component 122 can be a part of the instantiation of virtual machine instances. Alternatively, the computing device may a stand-alone device.

The general architecture of the textual output generation component 122 depicted in FIG. 2 includes an arrangement of computer hardware and software components that may be used to implement aspects of the present disclosure. As illustrated, the textual output generation component 122 includes a processing unit 204, a network interface 206, a computer readable medium drive 208, an input/output device interface 209, all of which may communicate with one another by way of a communication bus. The components of the textual output generation component 122 may be physical hardware components or implemented in a virtualized environment.

The network interface 206 may provide connectivity to one or more networks or computing systems, such as the network of FIG. 1. The processing unit 204 may thus receive information and instructions from other computing systems or services via a network. The processing unit 204 may also communicate to and from memory 210 and further provide output information. In some embodiments, the textual output generation component 122 may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the textual output generation component 122. The memory 210 may further include computer program instructions and other information for implementing aspects of the present disclosure. For example, in one embodiment, the memory 210 includes interface software 212 for receiving and processing requests from user devices 102 or transmitting processed results. Memory 210 includes a video processing component 216 for processing video data to identify context keywords as described herein. The video processing component 216 can illustratively be configured to interface with a first type of AI algorithm provided by a machine learning service provider 132 and configured to provide video recognition processing. The memory 210 further includes a dictionary processing component 218 for selecting and processing dictionaries of textual terms, as described herein. The memory 210 further includes an audio data processing component 220 for processing audio data to generate textual information. The audio processing component 220 can illustratively be configured to interface with a second type of AI algorithm provided by a machine learning service provider 132 and configured to provide audio processing and biased based on selected dictionaries.

As specified above, in one embodiment, the textual output generation component 122 illustrated in FIG. 2 can be implemented as physical computing devices or virtualized computing devices in a computing network. In another embodiment, the textual output generation component 122 may be implemented as logical components in a virtual computing network in which the functionality of the textual output generation component 122 6 is implemented by an underlying substrate network of physical computing devices. Thus, aspects of the present application should not be limited to interpretation requiring a physical, virtual or logical embodiment unless specifically indicated as such.

Figure 3:
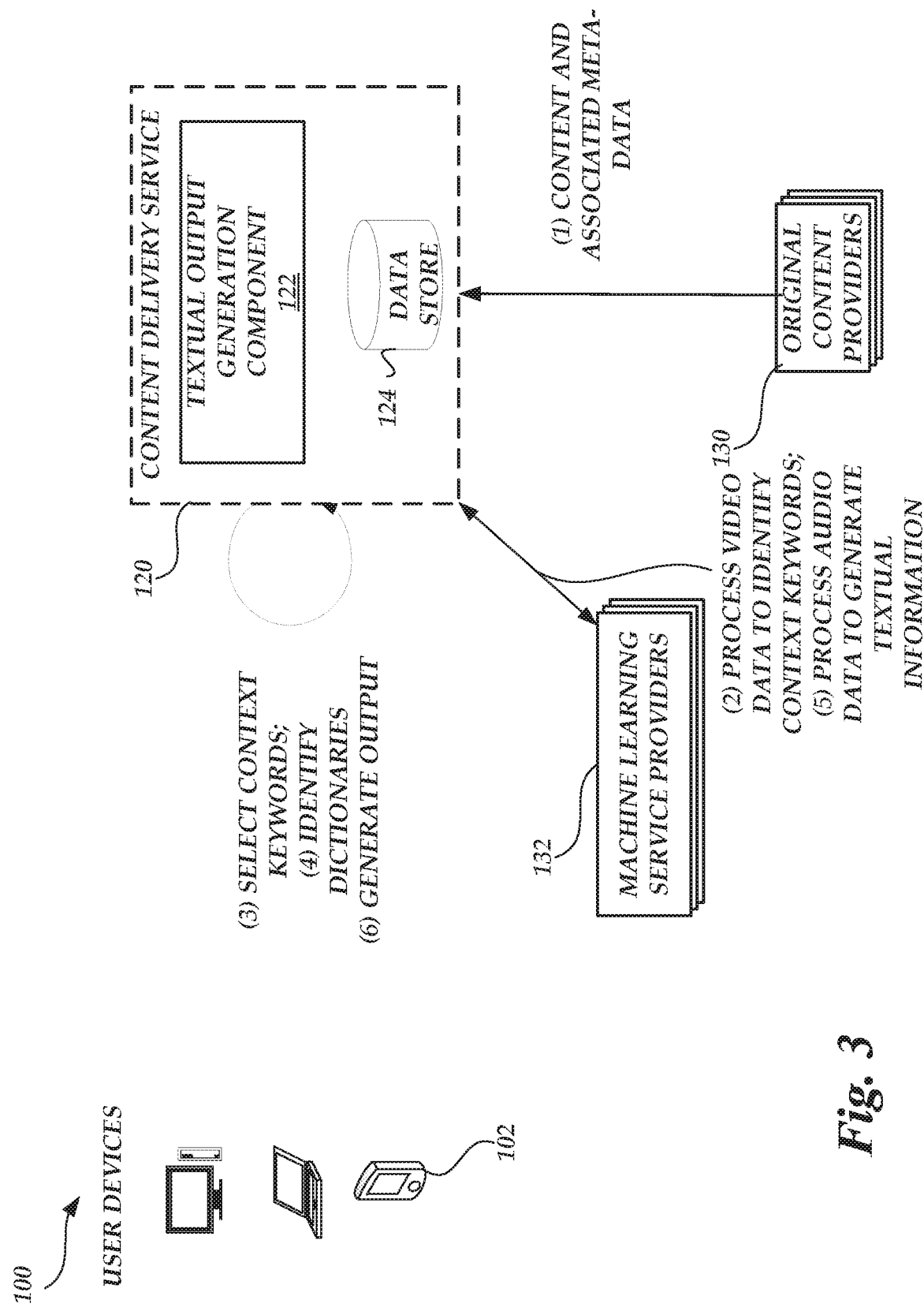
FIG. 3 is a block diagram of the content delivery environment of FIG. 1 illustrating the interaction related to the textual output generation component generating textual information.

With reference to FIG. 3, illustrative interactions of at least a subset of the components of the content delivery environment to generate textual information will be described. As described above, the content that will be processed can illustratively include a first portion corresponding to video data that depicts one or more items including objects, textual information, etc. The content can also illustratively include a second portion that corresponds audio data that is associated with the video data. At (1), the textual output generation component 122 obtains the video content. Illustratively, the received content (or "video content") can be provided by one or more content providers 130, such as via a content stream or other transmission. The video data portion and an audio data portion can be identified or parsed if transmitted together or may be transmitted separately. Additionally, in some embodiments, the content can also be associated with meta-data that facilitates the processing of either the video data or the audio data. In one example, the meta-data can include one or more keywords or suggestions that can be utilized to bias a machine learning video processing algorithm (e.g., a computer vision machine learning algorithm) to look for specific items depicted in the video data or to facilitate confirmation/validation for items identified by the machine learning algorithm. In another example, the meta-data can include timing information (or timing sequence information) that may suggest specific times in the video data to attempt to identify items in the video data. Such timing information may be indicative of scene changes, subject matter changes, and the like. In still a further example, the meta-data can include one or more contextual keywords that have been previously associated with the processing of the video data portion of the content, such as historical keywords/identifiers. In yet another example, the meta-data can include the identification of subject matter or relevant context information that can be utilized in the selection of keywords or dictionaries. For example, the meta-data can include the identification of two sporting teams depicted in the video data, which can be utilized to identify specific objects unique to the teams (e.g., numbers, uniforms, locations) or that can facilitate the selection of dictionaries specific to the type of sporting event, the two teams, the location and the like.

At (2), the textual output generation component 122 identifies one or more context keywords based on processing the video data. Illustratively, the textual output generation component 122 can cause the implementation of a first type of AI algorithm (or other algorithm) that is specifically configured to process video data and identify one or more context keywords corresponding to items identified in the video. As described above, the AI algorithm may be trained according a type of video content, specific configurations provided by the content provider 130, the machine learning service provider 132 or content delivery service provider 120. As described above, the AI algorithm may be configured or biased based on meta-data associated with the video content. The result of the processing of the AI algorithm can include a return of one or more context keywords (or a set of context keywords). Additionally, the one or more context keywords can also include timing information that identifies information about the keyword, such as where in the video data the keyword was identified, a range of timing information defining the potential relevance or applicability of the keyword, a total amount of time the object is depicted in the video data, and the like. Still further, in some embodiments, the AI algorithm can provide confidence values or rankings associated with the determination of the items in the video data, the number of times the items appear in the video data, or the significance of the appearance (in terms of total time). The confidence values may also be based on how the item is depicted in the video data, such as graphics in the video data vs. physical items depicted in the video data.

At (3), the textual output generation component 122 selects one or more context keywords for utilization in the processing of the audio data. In one embodiment, textual output generation component 122 can select all the context keywords provided by the video processing AI algorithm. In another embodiment, the textual output generation component 122 can filter the set of context keywords based on confidence values, ranking/priorities, etc. In another embodiment, the textual output generation component 122 can select context keywords that have been previously identified in other iterations of the video processing routine. Still further, the textual output generation component 122 can also attempt to group one or more context keywords that are known to be associated with a common dictionary of terms or set of dictionaries.

In one embodiment, the textual output generation component 122 can also supplemental context keywords with additional information, such as location information, user specified criteria and the like. For example, a user can specify specific dialects that may be associated with the video content. In another example, the location associated with some content will include relevant terms associated with the location, such as landmarks, celebrities, or newsworthy events.

At (4), the textual output generation component 122 selects one or more dictionaries associated with the selected context keywords. Illustratively, at dictionary of textual terms includes one or more terms that are associated with a context keywords or set of context keywords. For example, a dictionary of sporting terms may include a set of terms typically utilized to describe sporting events or used in the depiction of sporting events. A dictionary associated with a title of a specific play, a set of plays or to generally plays will include terms associated with characters of one or more plays, acting techniques or in the description of plays. The textual output generation component 122 can illustratively select a dictionary of terms for each selected context keywords. In other embodiments, the textual output generation component 122 can pick between multiple dictionaries based on commonality or overlap with context keywords.

At (4), the textual output generation component 122 causes the generation of textual information based on processing the audio data and utilizing the identified dictionaries. Illustratively, the textual output generation component 122 can cause the implementation of a second type of audio processing AI algorithm that is specifically configured to process audio data and generate transcription of the audio data. The audio processing AI algorithm may be trained according a type of audio content, specific configurations provided by the content provider 130 or content delivery service provider 120 and is illustratively biased toward matching a word found in the identified dictionaries. In some embodiments, the textual output generation component 122 can utilize timing information such that different sets (or subsets) of dictionaries may be used to process different types of audio data. For example, if the content corresponds to a broadcast/stream of an awards event, a first set of dictionaries may be utilized to bias the audio data processing during time periods associated with the awards ceremony. A second set of dictionaries may be utilized to bias the audio data during the post-award ceremony commentary or commercials during the broadcast. The result of the processing of the AI algorithm can include a return or storage of textual information, such as a stream of textual information. Additionally, in some embodiments, the AI algorithm can provide confidence values or rankings associated with the transcription of the audio data including associating confidence values for matching text with a dictionary.

At (5), the textual output generation component 122 outputs the generated textual information. Illustratively, the output of the textual information can include the generation of overlays for inclusion with the video content, such as in captioning information. In another textual output generation component 122 example, the output of the textual information can include the streaming of the textual information as a content stream. In still a further example, the output of the textual information can include the storage of the textual information. Other examples may also be implemented.

Figure 4:
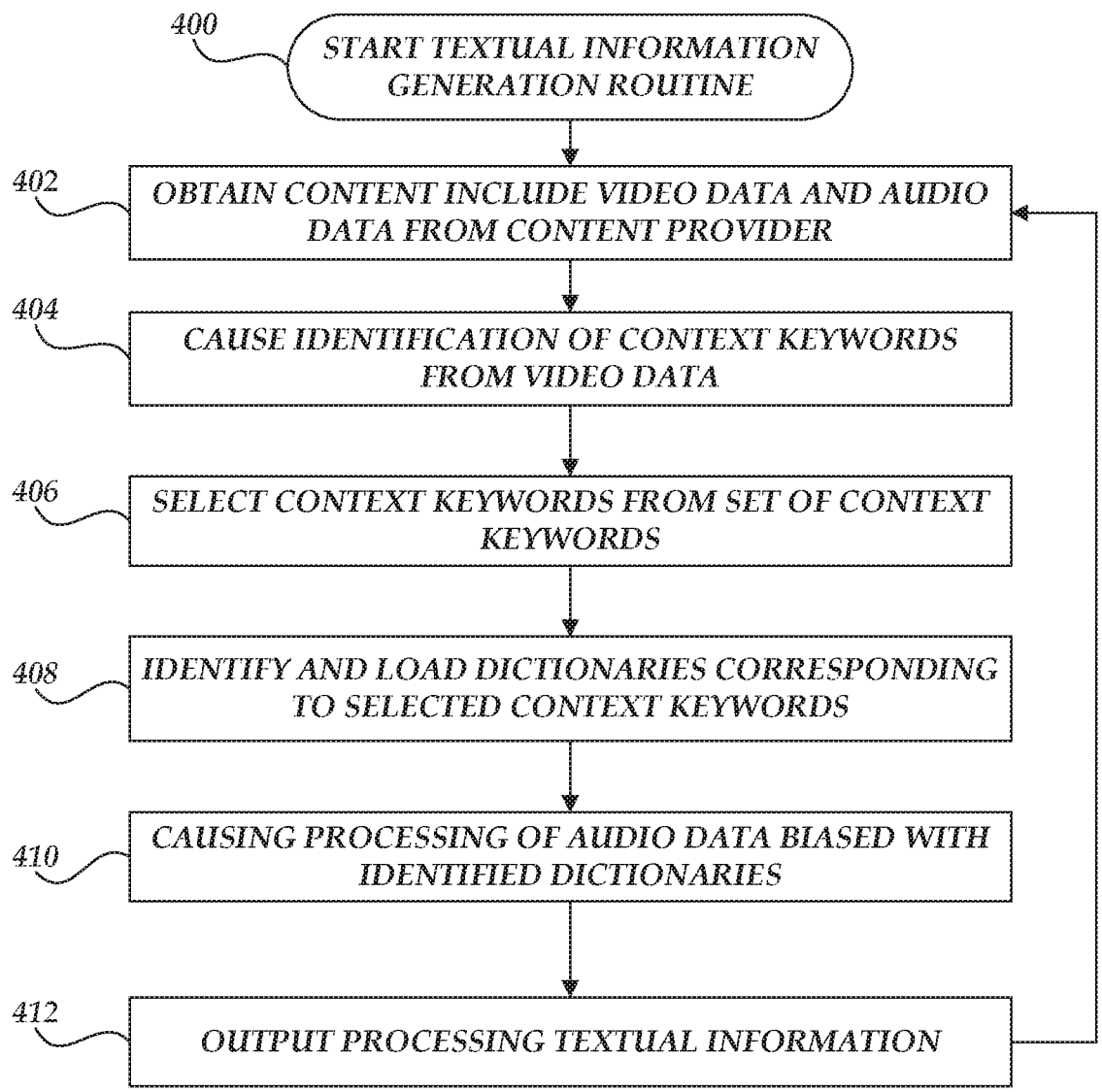
FIG. 4 is a flow diagram illustrative of a textual information generation routine implemented by a textual output generation component.

Turning now to FIG. 4, an illustrative routine 400 for processing video content will be described. As described above, the received content can illustratively include a first portion corresponding to video data that depicts one or more items. The received content can also illustratively include a second portion corresponding to audio data that is associated with the video data. At block 402, the textual output generation component 122 obtains the content. Illustratively, the content can be provided by one or more content providers 130, such as via a content stream or other transmission. The content can include a video data portion and an audio data portion that can be identified or parsed if transmitted together. Alternatively, the video data portion and audio data portion of the received content may be transmitted or provided independently.

In some embodiments, the video content can also be associated with meta-data that facilitates the processing of either the video data or the audio data. In one example, the meta-data can include one or more keywords or suggestions that can be utilized to bias a video processing algorithm to look for specific items. In another example, the meta-data can include timing information (or timing sequence information) that may suggest specific times in the video data to attempt to identify items in the video data. In still a further example, the meta-data can include one or more contextual keywords that have been previously associated with the processing of the video data portion of the video content, such as historical keywords/identifiers. In yet another example, the meta-data can include the identification of subject matter or relevant context information that can be utilized in the selection of keywords or dictionaries. For example, the meta-data can include the identification of two sporting teams depicted in the video data, which can be utilized to identify specific objects unique to the teams (e.g., numbers, uniforms, locations) or that can facilitate the selection of dictionaries specific to the type of sporting event, the two teams, the location and the like.

At block 404, the textual output generation component identifies one or more context keywords based on processing the video data. Illustratively, the textual output generation component 122 can cause the implementation of a video processing AI algorithm that is specifically configured to process video data and identify one or more context keywords corresponding to items identified in the video. The AI algorithm may be trained according a type of video content, specific configurations provided by the content provider 130 or content delivery service provider 120. As described above, the AI algorithm may be configured or biased based on meta-data associated with the video content. The result of the processing of the AI algorithm can include a return of one or more context keywords (or a set of context keywords). Additionally, the one or more context keywords can also include timing information that identifies information about the keyword, such as where in the video data the keyword was identified, a range of timing information defining the potential relevance or applicability of the keyword, a total amount of time the object is depicted in the video data, and the like. Still further, in some embodiments, the AI algorithm can provide confidence values or rankings associated with the determination of the items in the video data, the number of times the items appear in the video data, or the significance of the appearance (in terms of total time). The confidence values may also be based on how the item is depicted in the video data, such as graphics in the video data vs. physical items depicted in the video data.

At block 406, the textual output generation component 122 selects one or more context keywords for utilization in the processing of the audio data. The textual output generation component 122 can select all the context keywords provided by the AI algorithm. In another embodiment, the textual output generation component 122 can filter the set of context keywords based on confidence values, ranking/priorities, etc. In another embodiment, the textual output generation component 122 can select context keywords that have been previously identified in other iterations of routine 400. Still further, the textual output generation component 122 can also attempt to group one or more context keywords that are known to be associated with a common dictionary of terms or set of dictionaries.

In one embodiment, the textual output generation component 122 can also supplemental context keywords with additional information, such as location information, user specified criteria and the like. For example, a user can specify specific dialects that may be associated with the video content. In another example, the location associated with some content will include relevant terms associated with the location, such as landmarks, celebrities, or newsworthy events.

At block 408, the textual output generation component 122 selects one or more dictionaries associated with the selected context keywords. Illustratively, at dictionary of textual terms includes one or more terms that are associated with a context keywords or set of context keywords. For example, a dictionary of sporting terms may include a set of terms typically utilized to describe sporting events or used in the depiction of sporting events. A dictionary associated with a title of a specific play, a set of plays or to generally plays will include terms associated with characters of one or more plays, acting techniques or in the description of plays. The textual output generation component 122 can illustratively select a dictionary of terms for each selected context keywords. In other embodiments, the textual output generation component 122 can pick between multiple dictionaries based on commonality or overlap with context keywords. Additionally, as described above, in some embodiments, the textual output generation component 122 can select multiple dictionaries based on the timing information associated with the keywords. For example, the textual output generation component 122 can select a first dictionary (or set of dictionaries) during a first set of defined scenes. The textual output generation component 122 can select a second dictionary (or set of dictionaries) during a second set of defined scenes, such as immediately after a determined scene change. The first set and second of dictionaries may have one or more dictionaries in common. Each set may include one or more additional or supplemental dictionaries that may not be included in the other, respective set of dictionaries. In other embodiments, the first set and second set of dictionaries can have no dictionaries in common.

At block 410, the textual output generation component causes the generation of textual information based on processing the audio data and utilizing the identified dictionaries. Illustratively, the textual output generation component 122 can cause the implementation of a second type of AI algorithm that is specifically configured to process audio data and generate transcription of the audio data. The AI algorithm may be trained according a type of audio content, specific configurations provided by the content provider 130, the machine learning service provider 132 or content delivery service provider 120 and is illustratively biased toward matching a word found in the identified dictionaries. As described above, each AI algorithm may be configured to implement potential bias in different manners. Generally described, the bias of the AI algorithm results in a preference for the selection of one or more terms in the dictionaries, especially relative to terms not found in the dictionaries. However, such bias does not have to be absolute. The result of the processing of the AI algorithm can include a return of textual information. Additionally, in some embodiments, the AI algorithm can provide confidence values or rankings associated with the transcription of the audio data including associating confidence values for matching text with a dictionary.

At block 412, the textual output generation component 122 outputs the generated textual information. Illustratively, the output of the textual information can include the generation of overlays for inclusion with the video content, such as in captioning information. In another textual output generation component 122 example, the output of the textual information can include the streaming of the textual information as a content stream. In still a further example, the output of the textual information can include the storage of the textual information. Other examples may also be implemented. The routine 400 then returns to block 402 for continued processing.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for generating captioning information for streaming video content, wherein the streaming video content includes at least corresponding video data and audio data of encoded content segments, the system comprising:
   one or more computing devices associated with a textual output generation component, wherein the textual output generation component is configured to:
   identify video data from received encoded video content;
   cause a processing of the video data to identify a set of context keywords, the set of context keywords associated with one or more identified items depicted in the video data;
   select one or more of the identified set of context keywords;
   identify at least one dictionary of textual terms, wherein the dictionary of textual terms is identified based on an association with the selected one or more of the identified set of context keywords;
   cause a processing of audio data from the received encoded video content to form captioning information, wherein the processing of the audio data is biased according to textual terms in the identified at least one dictionary of textual terms; and
   output the captioning information.

2. The system of claim 1, wherein the textual output generation component selects the one or more of the identified set of context keywords based on a confidence value associated with the processed video data.

3. The system of claim 1, wherein the textual output generation component identifies a plurality of dictionaries of textual terms corresponding to a plurality of context keywords.

4. The system of claim 1, wherein the textual output generation component outputs the captioning information in a least one of a video overlay, a stream of captioning information or a storage of the captioning information.

5. A computer-implemented method for generating captioning information related to video content comprising:
   causing a processing of a first portion of the video content corresponding to video data to determine at least one context keyword, the determined at least one context keyword associated with items identified in the processed video data;
   identifying at least one dictionary of textual terms, wherein the dictionary of textual terms is identified based on an association with the determined at least one context keyword;
   causing a processing of a second portion of the video content corresponding to audio data to form captioning information, wherein the processing of the audio data is biased according to the identified at least one dictionary of textual terms; and
   outputting the captioning information.

6. The computer-implemented method of claim 5 further comprising obtaining identifiable context information from a content provider, wherein the processing of the first portion of the video content corresponding to the video data is biased by the identifiable context information from the content provider.

7. The computer-implemented method of claim 6, wherein the identifiable context information includes one or more keywords.

8. The computer-implemented method of claim 6, wherein the identifiable context information includes timing information associated with specified times in the video content for identifying context keywords.

9. The computer-implemented method of claim 8, wherein the timing information includes a set of timing information indicative of suggestions for determining a change of context keywords.

10. The computer-implemented method of claim 5, wherein causing a processing of the first portion of the video content corresponding to video data to identify the at least one context keyword includes causing a processing of the first portion of the video content corresponding to video data to identify a plurality of context keywords associated with the processed video data.

11. The computer-implemented method of claim 10 further comprising selecting one or more context keywords based on the plurality of context keywords for use in processing of the second portion of the video content corresponding to audio data.

12. The computer-implemented method of claim 11, wherein selecting the one or more context keywords is based on selecting the one or more context keywords based on confidence values associated with the processing of the first portion of the video content corresponding to video data.

13. The computer-implemented method of claim 11, wherein selecting the one or more context keywords is based on selecting the one or more context keywords based on a commonality of associated dictionary of textual terms.

14. The computer-implemented method of claim 10, wherein identifying at least one dictionary of textual terms includes identifying a plurality of dictionaries of textual terms correspond to the plurality of context keywords associated with the processed first portion of the video content corresponding to video data.

15. The computer-implemented method of claim 14, wherein the plurality of dictionaries of textual terms includes at least one default dictionary and at least one supplemental dictionary.

16. The computer-implemented method of claim 5, wherein identifying at least one dictionary of textual terms includes identifying a specific dictionary including a plurality of terms associated with the identified at least one context keyword and wherein the processing of the audio data is biased according to the identified specific dictionary by biasing toward a preference in selection for the plurality of terms in generating the captioning information.

17. The computer-implemented method of claim 5, wherein identifying at least one dictionary of textual terms includes identifying a dictionary including a plurality of terms and associated with a set of context keywords and wherein the processing of the audio data is biased according to the identified specific dictionary by biasing toward a preference in selection for the plurality of terms in generating the captioning information.

18. A computer-implemented method for generating textual information related to content, wherein the content includes video data and corresponding audio data, the method comprising:
 identifying at least one dictionary of textual terms based on a machine learning processing of video data from the content to identify at least one context keyword, wherein the dictionary of textual terms is identified based on an association with the identified at least one context keyword;
 causing implementation of a machine learning processing of audio data from the content to form captioning information, wherein the machine learning processing of the audio data is biased according to the identified at least one dictionary of textual terms; and
 outputting the captioning information.

19. The computer-implemented method of claim 18 further comprising obtaining one or more supplemental context information from a content provider, wherein the machine learning processing of the video data is biased by the supplemental context information to identify the at least one context keyword.

20. The computer-implemented method of claim 18, wherein identifying at least one context keyword includes identifying a plurality of context keywords associated with the machine learning processing of the video data.

21. The computer-implemented method of claim 18 further comprising selecting one or more context keywords for use in the machine learning processing of the audio data.

22. The computer-implemented method of claim 21, wherein selecting the one or more context keywords is based on selecting the one or more context keywords based on confidence values associated with the machine learning processing of the video data.

23. The computer-implemented method of claim 20, wherein identifying at least one dictionary of textual terms includes identifying a plurality of dictionaries of textual terms corresponding to the plurality of context keywords associated with the machine learning processing of the video data.

24. The computer-implemented method of claim 18, wherein identifying at least one dictionary of textual terms includes identifying a specific dictionary of textual terms associated with the identified at least one context keyword.

* * * * *

UNITED STATES PATENT AND TRADEMARK OFFICE
CERTIFICATE OF CORRECTION

Page 1 of 1

PATENT NO. : 10,885,903 B1
APPLICATION NO. : 16/215384
DATED : January 5, 2021
INVENTOR(S) : Leah Siddall It is certified that error appears in the above-identified patent and that said Letters Patent is hereby corrected as shown below:

On the Title Page

In Column 2, item (57), Abstract, Lines 13-14, delete "utilized used" and insert --utilized--.

In the Specification

In Column 3, Line 61, delete "utilized used" and insert --utilized--.

In the Claims

In Column 14, Line 7, Claim 4, delete "a least" and insert --at least--.

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*